United States Patent [19] [11] Patent Number: 4,836,648
Niwayama [45] Date of Patent: Jun. 6, 1989

[54] ANTI-GLARE REARVIEW ASSEMBLY FOR MOTOR VEHICLES
[75] Inventor: Toshikazu Niwayama, Saitama, Japan
[73] Assignee: Kabushiki Kaisha Matsuyama Seisakusho, Tokyo, Japan
[21] Appl. No.: 163,767
[22] Filed: Mar. 3, 1988
[30] Foreign Application Priority Data Mar. 6, 1987 [JP] Japan .............................. 62-33723[U]
Mar. 6, 1987 [JP] Japan ................................. 62-33724
Mar. 6, 1987 [JP] Japan ................................. 62-33725

[51] Int. Cl.⁴ .......................... B60R 1/04; G02B 5/08
[52] U.S. Cl. ................................................... 350/281
[58] Field of Search ......................................... 350/281
[56] References Cited
U.S. PATENT DOCUMENTS
3,918,799 11/1975 Kurz, Jr. et al. .

FOREIGN PATENT DOCUMENTS
53-24753 6/1978 Japan .
53-24754 6/1978 Japan .
58-26202 6/1983 Japan .
1228742 4/1971 United Kingdom ............... 350/281

Primary Examiner—John K. Corbin
Assistant Examiner—Rebecca D. Gass
Attorney, Agent, or Firm—Rosen, Dainow & Jacobs

[57] ABSTRACT

An anti-glare rearview mirror assembly for a motor vehicle has a bracket assembly mounted on one end of an external support member with the other end thereof coupled to a vehicle body, a housing molded of resin and swingably supported on the bracket assembly, a prismatic mirror fitted in an inner peripheral edge of the housing, and an operating tab coacting with the bracket assembly for angularly moving the housing with respect to the bracket assembly to shift the mirror between day and night positions. The bracket assembly comprises a block and a resilient small plate, one of which has convex portions or projections. When the housing is moved or flexed with respect to the block under external forces applied, the convex portions or projections engage the rear surface of the mirror to prevent the block and the housing from being released from mutual engagement. The convex portions or projections are positioned near an area where the external support member and the bracket assembly are coupled.

11 Claims, 10 Drawing Sheets

ANTI-GLARE REARVIEW ASSEMBLY FOR MOTOR VEHICLES

BACKGROUND OF THE INVENTION

1. Field of the Invention:

The present invention relates generally to a rearview mirror assembly for motor vehicles, and more particularly to an anti-glare rearview mirror assembly for motor vehicles which has a housing swingable to move a prismatic mirror disposed in the housing selectively between day and night positions.

2. Description of the Relevant Art:

As disclosed in Japanese Utility Model Publication No. 58-26202, one conventional automotive anti-glare rearview mirror assembly comprises a bracket attached to an external support member, a housing swingably supported on the bracket, a prismatic mirror fitted in the inner peripheral edge of the housing, and an operating tab cooperating with the bracket in serving as a toggle-type operating unit. The operating tab projects out of a tab slot defined in a lower portion of the housing. By turning the operating tab, the housing is angularly moved with respect to the bracket. Parallel, spaced attachment walls are integrally mounted in the housing, and have support projections with recesses. Stub shafts projecting from the bracket and operating tab, respectively, have both ends engaging in the recesses of the support projections, thus supporting the housing on the bracket. The bracket has central projections projecting outwardly from lateral sides thereof and are inserted in holder openings defined in the attachment walls to keep the housing and the toggle-type operating unit (bracket/operating tab).

In order to allow the housing to swing, the holder openings defined in the attachment walls should be large in size, and, as a result, gaps or clearances are produced between the projections and the edges of the corresponding holder openings after the rearview mirror assembly has been assembled. Therefore, when the housing is moved or flexed under an external load in excess of a certain level, the housing and the toggle-type operating unit may possibly be released out of engagement with each other. The projections/holder openings which are provided to keep the housing and the toggle-type operating unit in reliabe engagement are positioned substantially intermediate between a position in which the stub shaft of the bracket engages the support projection of the attachment wall and a position in which the stub shaft of the operating tab engages the support projection of the attachment wall. Accordingly, the housing and the toggle-type operating unit cannot effectively be prevented from being released out of engagement. More specifically, when the housing is deformed or moved under shocks applied, the stub shafts may first be forced out of the recesses of the support projections, and then the projections may come out of the holder openings. When inserting the projections into the holder openings, considerable forces are required to be applied, resulting in an awkward assembling process.

Japanese Utility Model Publications Nos. 53-24753 and 53-24754 disclose anti-glare rearview mirror assemblies. In the disclosed rearview mirror assembly structures, a holder plate is secured to a housing in covering relation to the front surface of a toggle-type operating unit so that the housing and the toggle-type operating unit will not be forced out of engagement even when the housing is deformed under external loads. According to these conventional arrangements, however, the number of parts including the holder plate is increased, and as a result the sturcture of the rearview mirror assembly is complex and time-consuming to assemble.

SUMMARY OF THE INVENTION

It is a primary object of the present invention to provide an anti-glare rearview mirror assembly for motor vehicles which has a bracket assembly and a housing that are prevented from brought out of engagement even when an external load exceeding a prescribed level is applied to the rearview mirror assembly.

Another object of the present invention is to provide an anti-glare rearview mirror assembly for motor vehicles which is simple in structure and can be assembled with ease.

According to the present invention, there is provided an anti-glare rearview mirror assembly for a motor vehicle having a vehicle body, comprising bracket means adapted to be mounted on one end of an external support member with the other end thereof coupled to the vehicle body, a housing swingably supported on the bracket means, a mirror fitted in an inner peripheral edge of the housing, mirror position selecting means coacting with the bracket means for angularly moving the housing with respect to the bracket means to shift the mirror between first and second positions, and disengagement preventing means disposed near an area where the housing is supported on the bracket means, for preventing the bracket means and the housing from being released from mutual engagement.

The bracket means comprises a block and a plate member of metal secured to the block, the block and the plate member cooperating with the external support member in providing a ball joint. The disengagement preventing means comprises at least one convex portion projecting from the block toward the mirror, or at least one projection extending from the plate member toward the mirror. When the housing is turned or moved under external forces applied, the convex portions or projections abut against the rear surface of the mirror to limit the movement or flexing of the housing, which is thus prevented from being dislodged from the block.

The convex portions or projections are positioned near an area where the housing is supported on the block to prevent the housing from being disengaged most effectively. The position of the convex portions or projections is near an area where the external support member is coupled to the clock/plate member. When external forces are applied to a lower portion of the housing, the lower portion of the housing is flexed to a certain extent to absorb the applied forces. When external forces are imposed on an upper portion of the housing, since the upper portion of the housing is coupled to the external support member, the upper portion of the housing cannot be flexed to the same extent as the lower portion thereof, and hence cannot absorb the applied forces. As a result, the load would concentrate on the region where the bracket and the housing engage each other, and the bracket and the housing would be likely to be disengaged. According to the present invention, the disengagement preventing means is provided near the region on which the load concentrates for effectively preventing the housing and the bracket from being released from mutual engagement.

The convex portions or projections may be replaced with ridges or tongues disposed on the plate member and having engaging surfaces. The ridges can be brought into engagement with projections on an inner surface of the housing for preventing the housing and the bracket or block from being disengaged.

A gap or clearance is defined between the mirror and the convex portions or plate member or between the engaging surfaces of the tongues and the projections of the housing. The gap is effective to prevent the rear surface of the mirror from contacting these convex portions, projections, or the like and hence from being limited in its swinging movement when the housing is turned to move the mirror between the first position or a day position and the second position or a night position. If the gap were too large, however, the housing and the block would be relatively be moved out of engagement under external forces applied, before the convex portions, projections, or the like engage the rear surface of the mirror. Therefore, the gap should be of such an extent that the convex portions or the like will engage the rear surface of the mirror or the engaging surfaces of the tongues will engage the projections of the housing before the engagement between the housing and the bracket would be lost.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 1(*a*) is a vertical cross-sectional view of an anti-glare rearview mirror assembly according to a first embodiment of the present invention, the mirror being shown as assuming a day position;

FIG. 1(*b*) is a view similar to FIG. 1(*a*), showing the mirror assembly as being in a night position;

FIG. 4(*a*) is a fragmentary front elevational view of a housing of the anti-glare rearview mirror assembly;

FIG. 4(*b*) is a fragmentary perspective view of the housing;

FIG. 5 (*a*) is a front elevational view of a block;

FIG. 5 (*b*) is a side elevational view of the block;

FIG. 6 (*a*) is a front elevational view of a plate member used in association with the block shown in FIGS. 5(*a*) and 5(*b*);

FIG. 6(*b*) is a side elevational view of the plate member;

FIG. 7(*a*) is a front elevational view of an operating tab;

FIG. 7(*b*) is a side elevational view of the operating tab;

FIG. 10(*a*) is a front elevational view of a block in the anti-glare rearview mirror assembly shown in FIG. 9;

FIG. 10(*b*) is a side elevational view of the block;

FIG. 11(*a*) is a perspective view of a plate member;

FIG. 11(*b*) is a front elevational view of the plate member;

FIG. 11(*c*) is a side elevational view of the plate member;

FIG. 16(*a*) is a fragmentary front elevational view of a housing of the anti-glare rearview mirror assembly shown in FIG. 15;

FIG. 16(*b*) is a fragmentary perspective view of the housing;

DETAILED DESCRIPTION OF THE PREFERRED EMBODIMENTS

Identical or similar parts are denoted by identical reference numerals throughout the views.

Figures 1A, 1B:
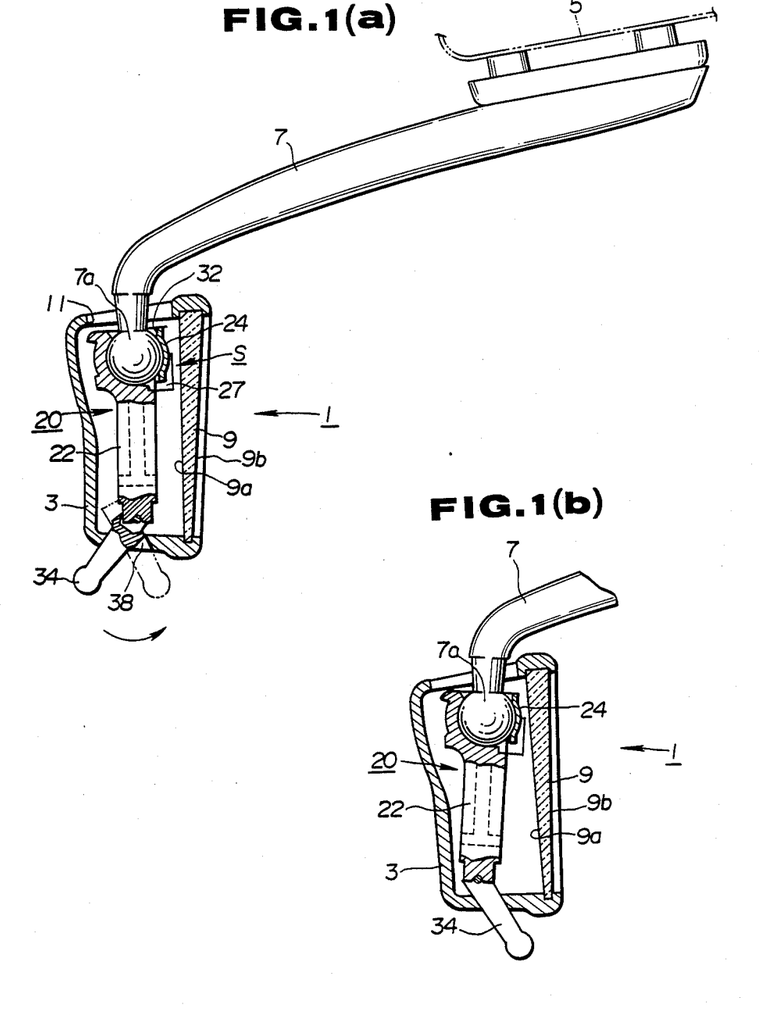
Figure 2:
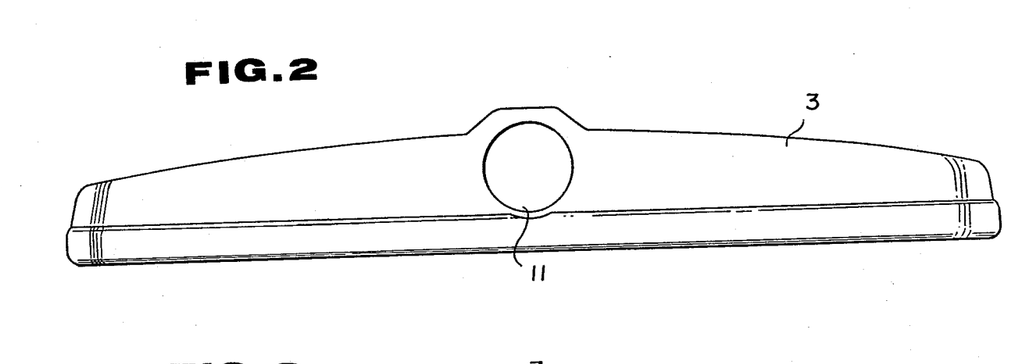
FIG. 2 is a plan view of the anti-glare rearview mirror assembly of the first embodiment.

As shown in FIG. 1(*a*), an anti-glare rearview mirror assembly 1 for a motor vehicle according to the present invention has a housing 3 suspended from a vehicle body 5 by a rod-shaped support member 7 and a prismatic mirror 9 of a tapered cross section fitted in the inner peripheral edge of the housing 3. The mirror 9 has its back coated with aluminum deposited by vacuum evaporation. As shown in FIG. 2, the housing 3, which is of a unitary structure molded of resin such as polypropylene, has a circular opening 11 defined in an upper wall and through which a free end of the suport member 7 extends into the housing 3.

Figure 3:
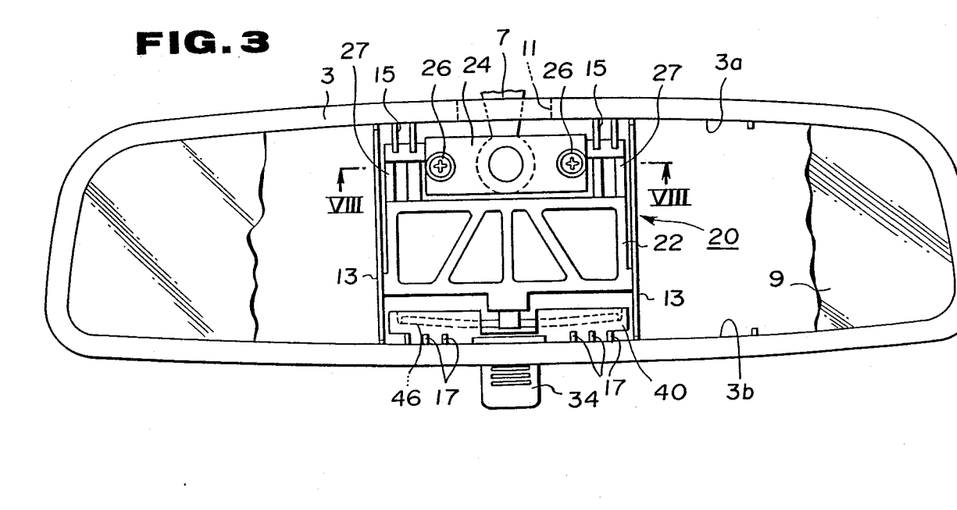
FIG. 3 is a front elevational view of the anti-glare rearview mirror assembly, the mirror assembly being partly omitted from illustration for showing an internal structure.
Figure 4:
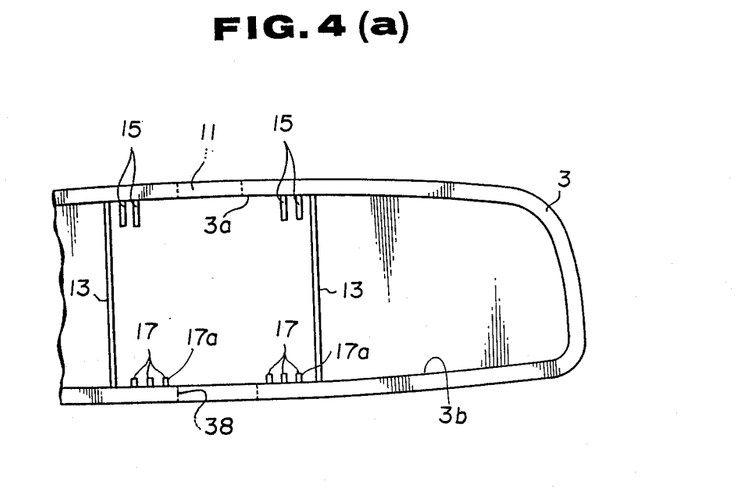

As illustrated in FIGS. 3 and 4, the housing 3 has two parallel, spaced guide ribs 13 disposed centrally therein and extending between upper and lower walls 3*a*, 3*b*of the housing 3, and a plurality of projections or teeth 15, 17 on the upper and lower walls 3*a*, 3*b*, the teeth 15, 17 having respective recesses 15*a*, 17*a*. Between the guide ribs 13, there is disposed a bracket assembly 20 serving as a socket on which a ball 7*a* on the free end of the support member 7 is rotatably and resiliently received. As will be described in detail below, the bracket assembly 20 comprises a block 22 of a unitary structure molded of resin such as acetal resin, and a thin small plate 24 of metal fastened to the block 22 by screws 26 for coorporation with the block 22.

Figure 5A:
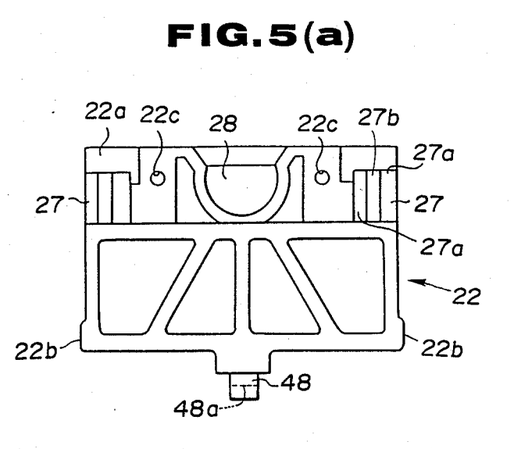
Figure 5B:
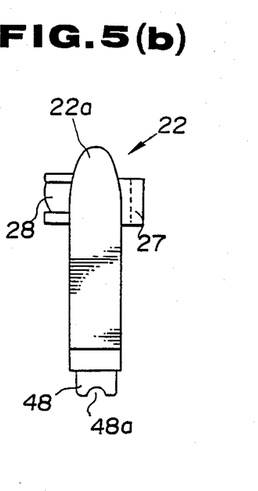
Figure 6A:
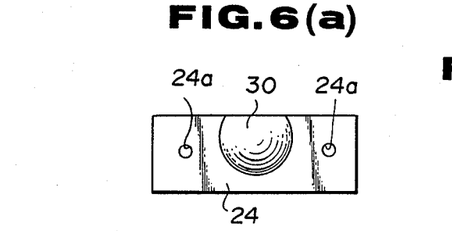
Figure 6B:
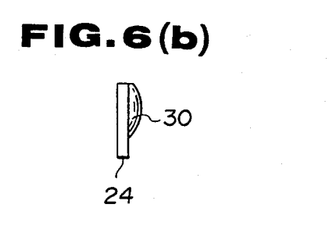

As shown in FIGS. 5(*a*), 5(*b* ), 6(*a*), and 6(*b*), the block 22 is substantially rectangular in shape when viewed in front elevation, and has an upper surface 22*a* of a semicircular cross section which engages in the recesses 15 of the teeth 15 and serves as a pivot shaft for swinging movement of the housing 3, and side surfaces 22*b* held against the guide ribs 13, respectively. The block 22 also has two projections or convex portions 27 at opposite ends of one surface of the block 22 facing the mirror 9, i.e., the front surface of the block 22, and a hemispherical cavity 28 defined centrally in the front surface of the block 22. Each of the convex portions 27 is of a substantially U shape including two spaced portions 27a engageable with the rear surface 9a of the mirror 9 and a groove 27b positioned between the portions 27a, the portions 27a and the groove 27b having the same width. The resilient thin small plate 24 also has a hemispherical cavity 30 defined centrally in one surface thereof. When the small or resilient plate 24 is attached to the block 22, the cavities 28, 30 jointly define a substantially spherical bearing 32 in which the ball 7a is resiliently received. Thus, the supsport member 7 and the bracket assembly 20 provide a ball joint about which the housing 3 can be rotated in any desired direction. Therefore, the driver of the motor vehicle can easily adjust his or her rearview sight.

Figure 7A:
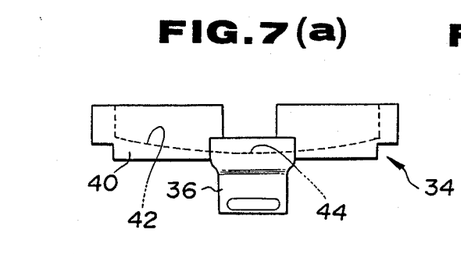
Figure 7B:
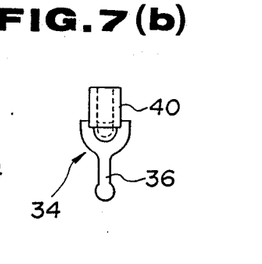
Figure 8:
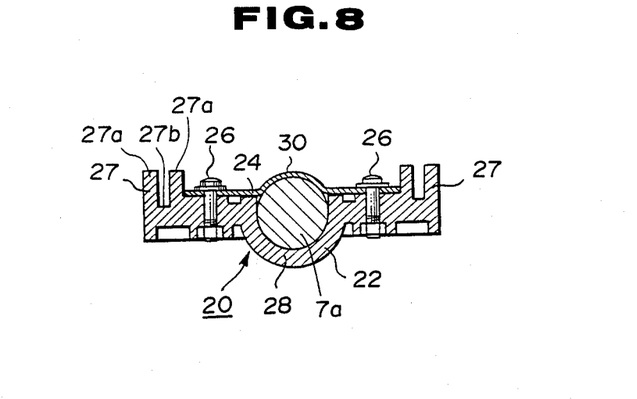
FIG. 8 is a cross-sectional view taken along line VIII—VIII of FIG. 3.
Figure 9:
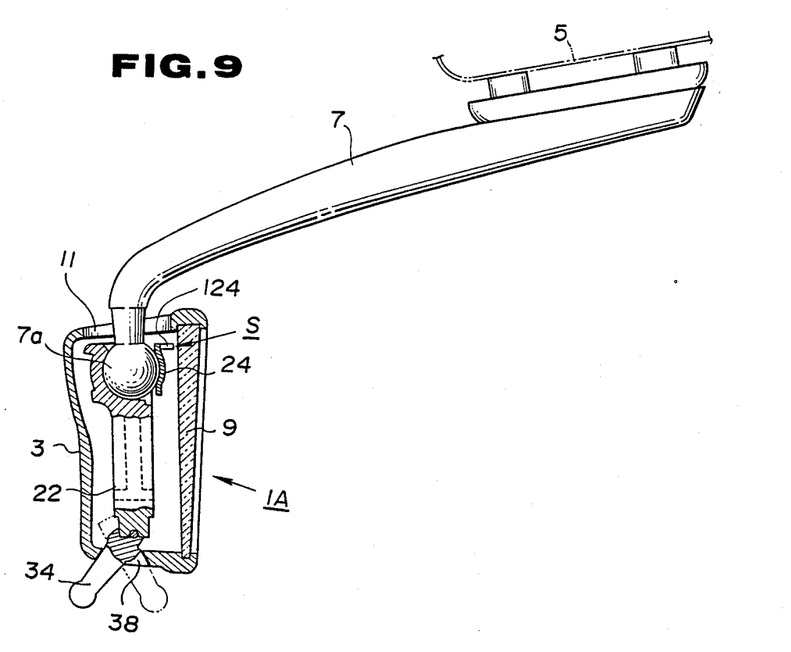
FIG. 9 is a vertical cross-sectional view of an anti-glare rearview mirror assembly according to a second embodiment of the present invention.
Figure 10A:
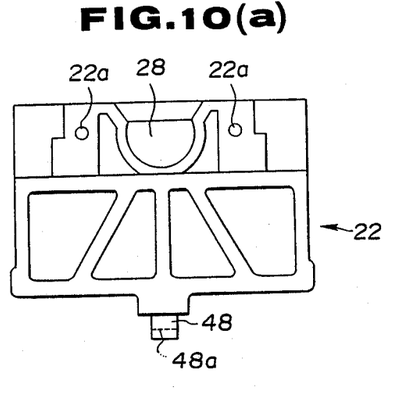
Figure 10B:
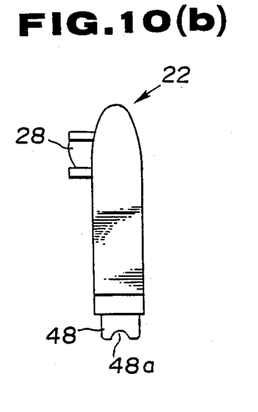
Figure 11A:
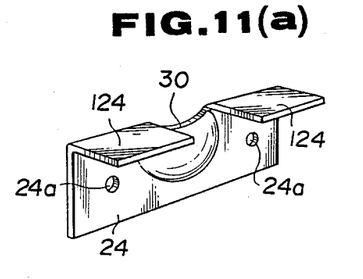
Figure 11B:
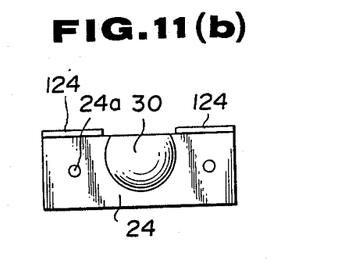
Figure 11C:
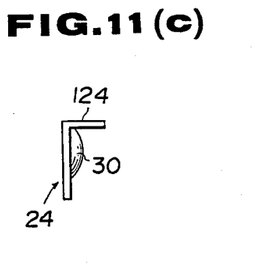

An operating tab 34 shown in FIGS. 7(a) and 7(b) is pivotally coupled to the block 22. The bracket assembly 20 and the operating tab 34 jointly constitute a toggle mechanism. The operating tab 34 comprises a central member 36 projecting out of the housing 3 through a rectangular opening 38 (FIG. 4(b)) defined centrally in the lower wall of the housing 3, and a pair of side members 40 integrally formed in the central member 36 on its opposite sides and engaging in the recesses 17a of the teeth 17. The central member 36 and the side members 40 have grooves 42, 44 in which a spring 46 (FIG. 3) is housed. The block 22 has a projection 48 on a central lower end thereof, the projection 48 having a recess 48a in which a substantially central portion of the spring 46 engages.

The toggle mechanism (bracket assembly/operating tab) is assembled into the housing 3 in the following manner: First, the spring 46 is inserted in the grooves 42, 44 in the operating tab 34. Then, the operating tab 34 is inserted in the opening 48, and the side members 40 are fitted in the recesses 17a of the teeth 17. After the operating tab 34 has been installed, the recess 48a of the projection 48 of the block 22 is fitted over the spring 46 at its substantially central area, and the upper surface 22a of the block 22 is fitted in the recesses 15a of the teeth 15. In this condition, the block 22 is urged upwardly under the forces of the spring 46. After screw holes 22c of the block 22 and screw holes 24a of the small plate 24 have been registered, the screws 26 are threaded into these screw holes 22c, 24a.

Normally, the operating tab 34 is in the solid-line position shown in FIG. 1(a), in which a rear reflecting surface 9a having higher reflectivity of the mirror 9 lies substantially vertically. By moving the operating tab 34 from the solid-line position to the broken-line position, the housing 3 is caused by the toggle mechanism to turn about the upper surface 22a of the block 22 in the direction of the arrow. As a result, the mirror 9 is turned from the day position to the night position shown in FIG. 1(b). At this time, a front surface 9b of lower reflectivity of the mirror 9 lies substantially vertically to reduce the intensity of light, as reflected by the mirror 1, from the headlights of a motor vehicle behind.

As illustrated in FIGS. 1(a) and 1(b), a small gap or clearance S is left between the convex portions 27 of the block 22 and the mirror 9. When the housing 3 is moved or flexed with respect to the block 22 under external forces applied, the tip surfaces of the convex portions 27 are brought into abutment against the rear surface 9a of the mirror 9. As a result, the housing 3 and the block 22 or the toggle mechanism are prevented from being released from mutual engagement. The position of the convex portions 27 is selected to be close to the area where the block 22 and the housing 3 engage each other, i.e., the point about which the housing 3 is angularly movable, so that the housing 3 and the block 22 will be kept in reliable engagement with each other. The convex portions 27 are also positioned near the area where the external support member 7 and the bracket assembly 20 are coupled. Such positional relationship is also effective in preventing the block 22 and the housing 3 from being released from engagement. This is because when external forces are applied to an upper portion of the housing 3, since the upper portion of the housing 3 is less flexible than the lower portion thereof, the applied forces cannot be absorbed, but imposed on the upper portion of the housing 3 where the housing 3 and the block 22 engage each other, so that it would be highly likely for the housing 3 and the block 22 to be disengaged from each other.

FIGS. 9 through 11(a), 11(b), 11(c) illustrate an anti-glare rearview mirror assembly 1A according to a second embodiment of the present invention. In this embodiment, the convex portions 27 of the preceding embodiment are replaced with projections or tongues 124 (FIGS. 11(a), 11(b), 11(c)) extending from an upper edge of the small plate 24 toward the rear surface 9a of the mirror 9, with a gap or clearance S (FIG. 9) being present between the tip ends of the tongues 124 and the rear surface 9a of the mirror 9. The housing 3 and the block 22 is prevented from being disengaged when the tongues 124 abut against the rear surface 9a of the mirror 9.

Figure 12:
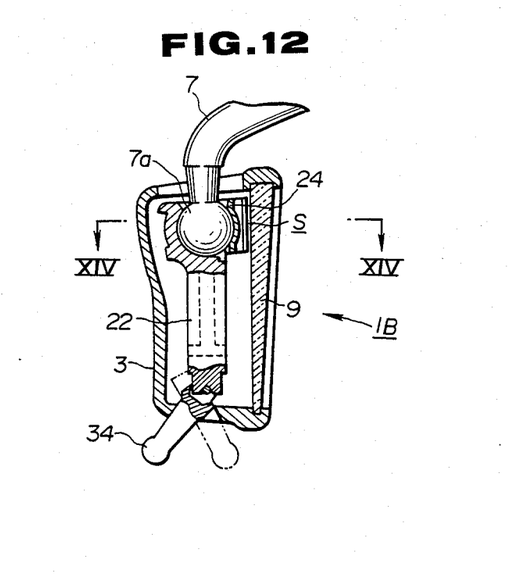
FIG. 12 is a vertical cross-sectional view of an anti-glare rearview mirror assembly according to a third embodiment of the present invention.
Figure 13:
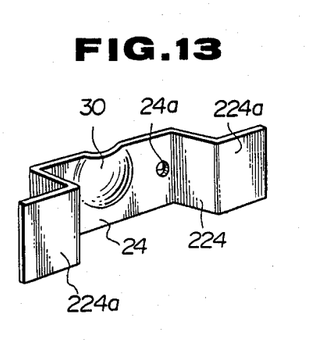
FIG. 13 is a perspective view of a plate member in the anti-glare rearview mirror assembly illustrated in FIG. 12.
Figure 14:
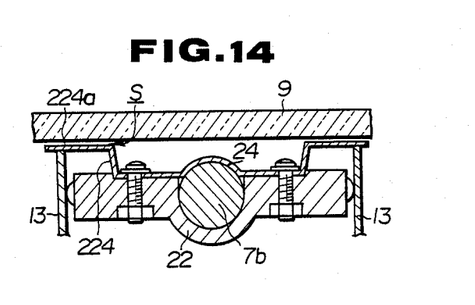
FIG. 14 is a cross-sectional view taken along line XIV—XIV of FIG. 12.

FIGS. 12 through 14 show an anti-glare rearview mirror assembly 1B according to a third embodiment of the present invention. Projections 224 of substantially L-shaped cross section extend from opposite lateral sides of the small plate 24. Each of the projections 224 has an engaging surface 224a which is brought into surface-to-surface contact with the rear surface 9a of the mirror 9 when the housing 3 is moved or flexed relatively to the block 22. Therefore, the load applied to the mirror can be distributed more widely than it is in the previous embodiments in which the projections are brought into linear contact with the rear surface 9a of the mirror 9.

Figure 15:
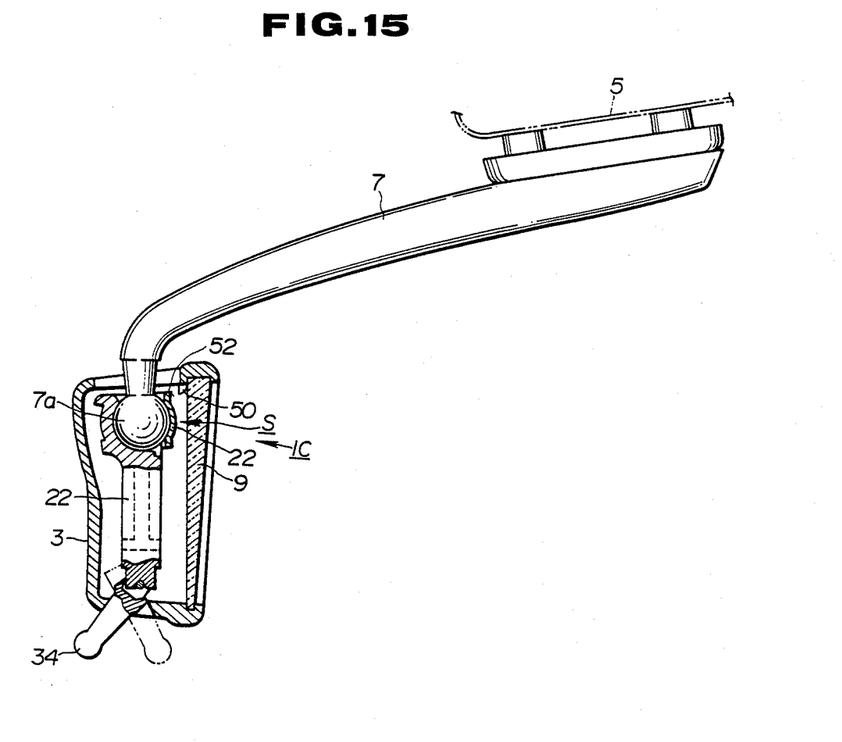
FIG. 15 is a vertical cross-sectional view of an anti-glare rearview mirror assembly according to a fourth embodiment of the present invention.
Figure 16A:
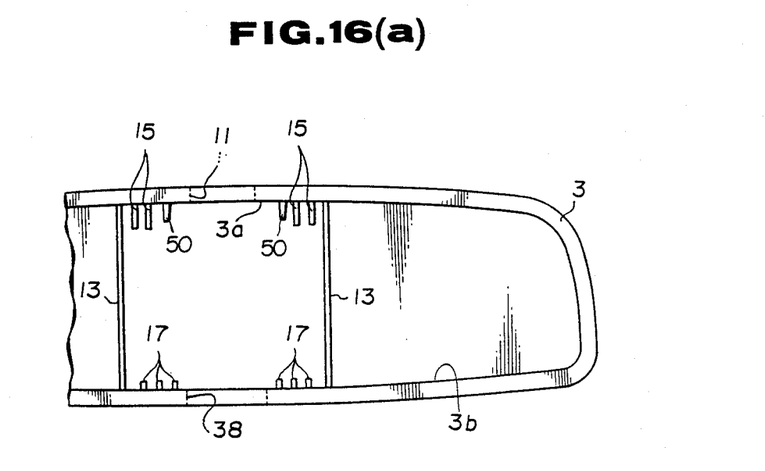
Figure 16B:
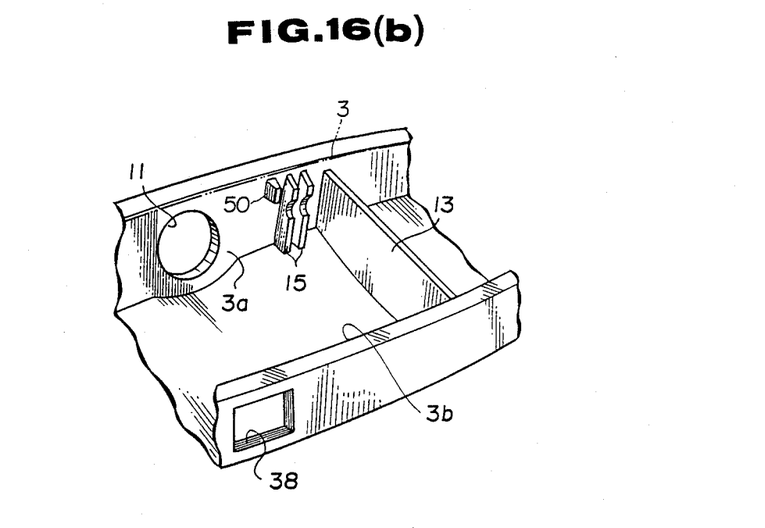
Figure 17:
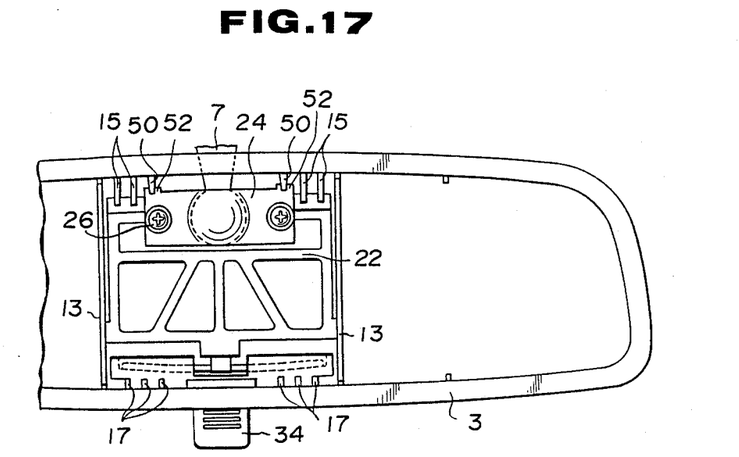
FIG. 17 is a front elevational view of the anti-glare rearview. mirror assembly, the mirror assembly being partly omitted from illustration for showing an internal structure.
Figure 18:
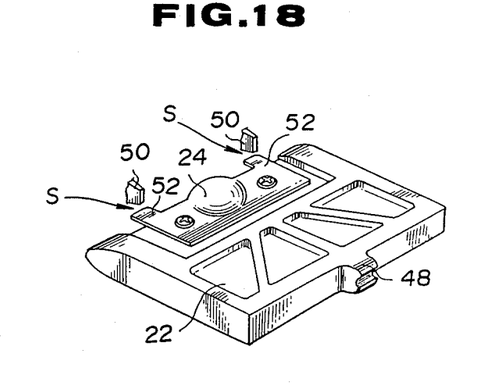
FIG. 18 is a perspective view of a bracket means and small projections.

An anti-glare rearview mirror assembly 1C according to a fourth embodiment of the present invention is shown in FIGS. 15 through 18. As shown in FIGS. 16(a) and 16(b), two small projections 50 are disposed on the upper wall 3a of the housing 3 near the teeth 15. As illustrated in FIGS. 17 and 18, the small plate 24 has two ridges 52 on its upper edge at its opposite ends. After the bracket assembly is assembled in the housing 3, a small gap or clearance S (FIG. 15) is defined between the ridges 52 and the small projections 50. When the housing 3 is moved or flexed with respect to the block 22, the ridges 52 and the small projections 50 engage each other to prevent the block 22 and the toggle mechanism or the housing from being released from each other.

the gap S defined between the rear surface 9a of the mirror 9 and the tip ends of the convex portions 27, or the tongues 124 of the plate 24, or the engaging surfaces 224a, or between the ridges 52 and the projections 50, should be of such an extent that when the housing 3 is turned to move the mirror 9 between the day and night positions, the rear surface 9a of the mirror 9 does not contact these ridges, engaging surfaces, or engaging surfaces and desired swinging movement thereof is not limited, and that when external forces are applied to the housing 3, the ridges, engaging surfaces, or engaging surfaces abut against the rear surface 9a of the mirror 9 or the ridges 52 engage the small projections 50, before the housing 3 and the block 22 would otherwise be disengaged from each other due to their relative movement.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. An anti-glare rearview mirror assembly for a motor vehicle having a vehicle body, comprising:
    bracket means adapted to be mounted on one end of an external support member with the other end thereof coupled to the vehicle body;
    a housing swingably supported on said bracket means;
    a mirror fitted in an inner peripheral edge of said housing;
    mirror position selecting means coacting with said bracket means for angularly moving said housing with respect to said bracket means to shift said mirror between first and second positions; and
    disengagement preventing means disposed near an area where said housing is supported on said bracket means, for preventing said bracket means and said housing from being released from mutual engagement.

2. An anti-glare rearview mirror assembly according to claim 1, wherein said bracket means comprises a block, and said disengagement preventing means comprises at least one projection projecting from said block toward said mirror.

3. An anti-glare rearview mirror assembly according to claim 2, wherein said bracket means is swingably coupled to said external support member.

4. An anti-glare rearview mirror assembly according to claim 3, wherein said projection is positioned near an area where said bracket means is coupled to said external support member.

5. An anti-glare rearview mirror assembly according to claim 1, wherein said bracket means comprises a block and a plate member of metal secured to said block, and said disengagement preventing means comprises at least one projection projecting from said plate member toward said mirror.

6. an anti-glare rearview mirror assembly according to claim 5, wherein said bracket means is swingably coupled to said external support member.

7. An anti-glare rearview mirror assembly according to claim 6, wherein said projection is positioned near an area where said bracket means is coupled to said external support member.

8. An anti-glare rearview mirror assembly according to claim 1, wherein said bracket means comprises a block and a plate member of metal secured to said block, and said disengagement preventing means comprises at least one projection projecting from an inner surface of said housing, and an engaging portion disposed on said plate member and engageable with said projection of said housing.

9. An anti-glare rearview mirror assembly according to claim 8, wherein said engaging portion has at least one ridge.

10. An anti-glare rearview mirror assembly according to claim 8, wherein said bracket means is swingably coupled to said external support member.

11. An anti-glare rearview mirror assembly according to claim 10, wherein said projection and said engaging portion are positioned near an area where said bracket means is coupled to said external support member.

* * * * *